C. N. CAMPBELL.
HARROW.
APPLICATION FILED FEB. 24, 1914.
1,105,022.
Patented July 28, 1914.
2 SHEETS—SHEET 1.
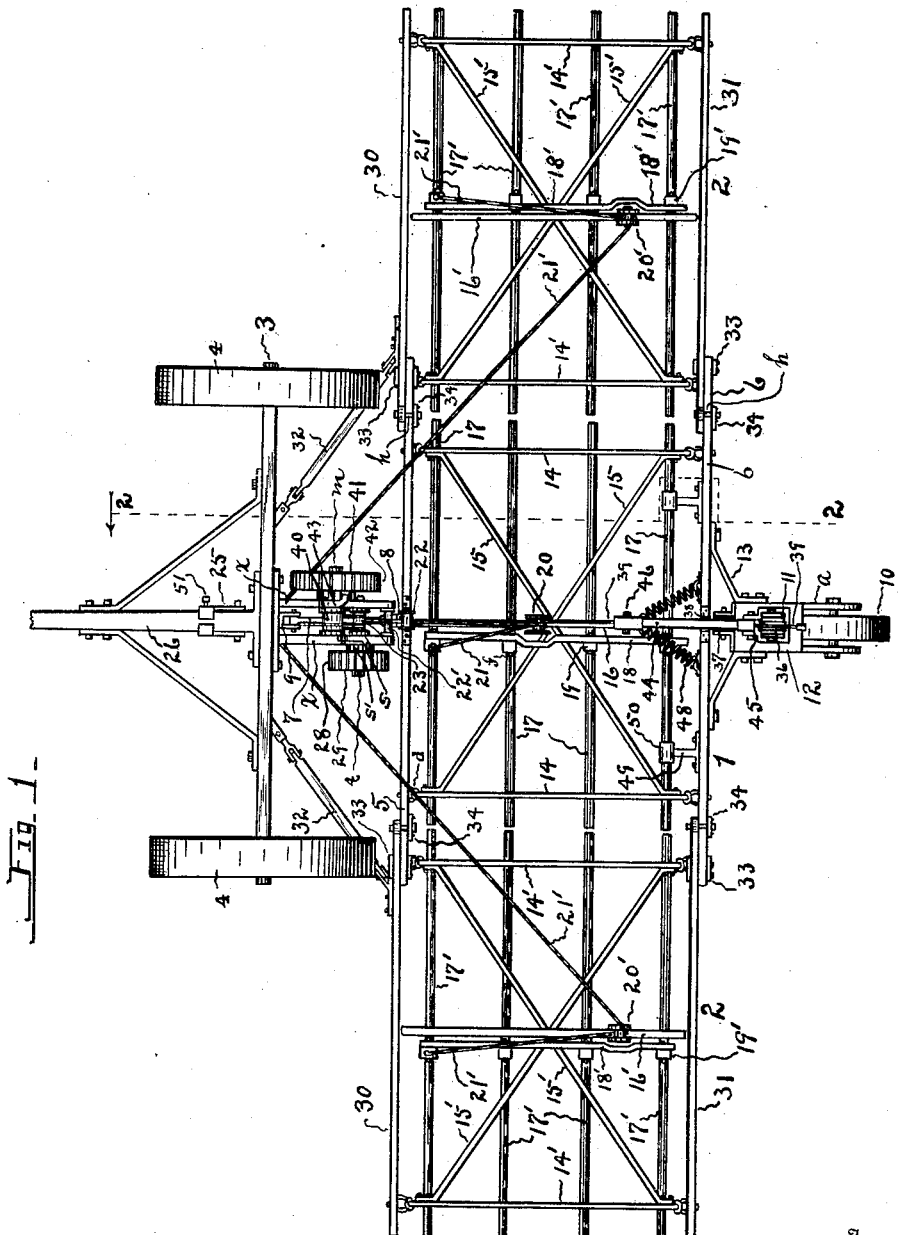
Witnesses
A. R. Leyson.
Gill S. Peyton.
Inventor
Calvin N. Campbell,
By Hiram A. Sturges,
Attorney C. N. CAMPBELL.
HARROW.
APPLICATION FILED FEB. 24, 1914.
1,105,022.
Patented July 28, 1914.
2 SHEETS—SHEET 2.
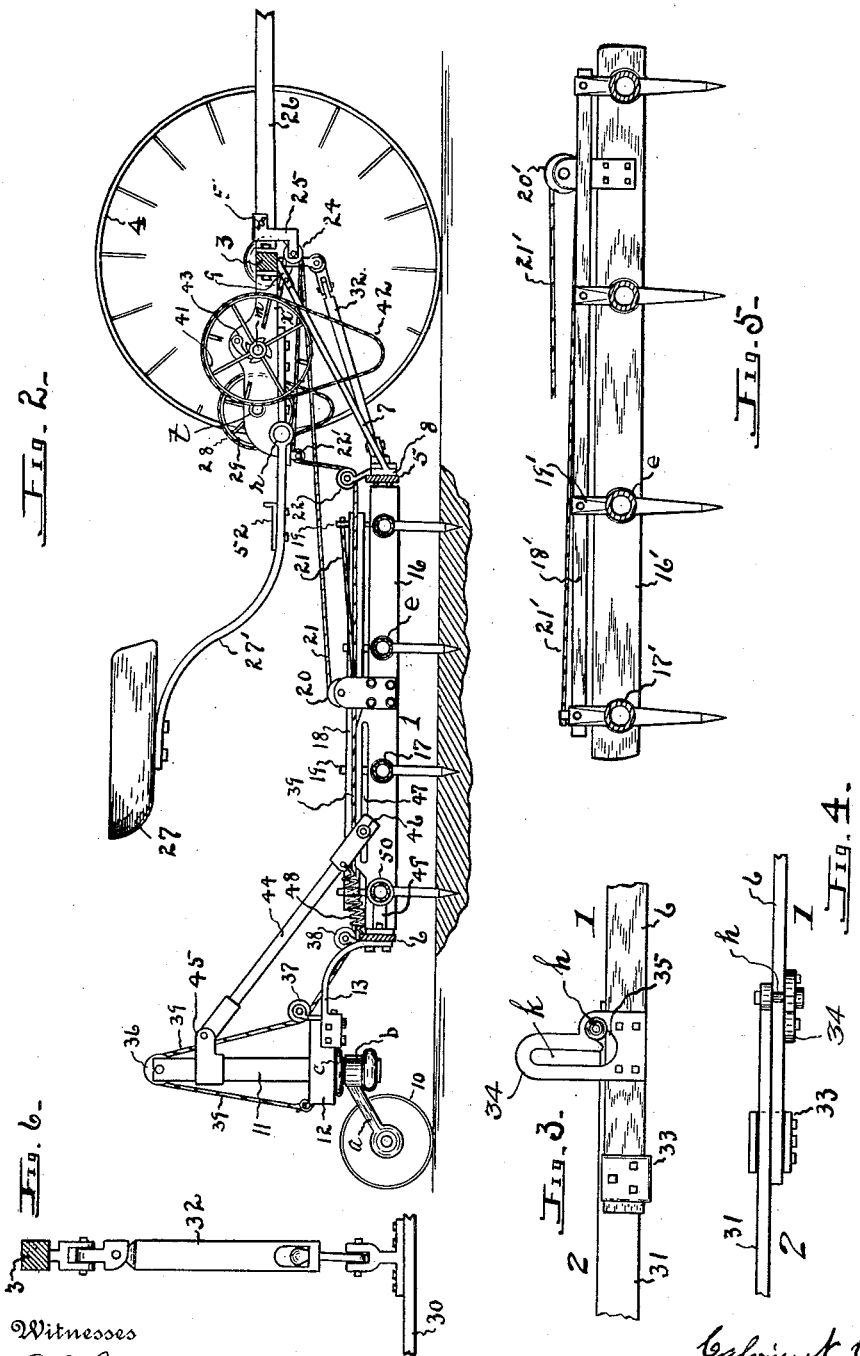

UNITED STATES PATENT OFFICE.

CALVIN N. CAMPBELL, OF MISSOURI VALLEY, IOWA, ASSIGNOR OF ONE-FOURTH TO PEARL M. EDWARDS, OF WARD, IOWA.

HARROW.

1,105,022.   Specification of Letters Patent.   Patented July 28, 1914.

Application filed February 24, 1914. Serial No. 820,405.

*To all whom it may concern:*

Be it known that I, CALVIN N. CAMPBELL, a citizen of the United States, residing at Missouri Valley, in the county of Harrison and State of Iowa, have invented certain new and useful Improvements in Harrows, of which the following is a specification.

This invention relates to an improvement in harrows, and has for one of its objects to provide means for elevating the sections which carry the harrow teeth when moving over obstructions and for folding them when driving through a gateway or the like.

Another object is to provide a harrow which may be conveniently " turned about " at the end of a field, and to provide means for changing the inclination of the teeth, all to be under control of an operator who may make these changes readily while riding on the harrow.

With these objects in view, and others to be mentioned hereinafter, the invention presents a novel construction, combination and arrangement of parts as described and claimed, and as illustrated in the drawing, wherein,—

Figure 1 is a plan view of the harrow, the driver's seat being omitted. Fig. 2 is a view of the same in section, the view being on line 2 2 of Fig. 1, the brace-rods being omitted. Figs. 3 and 4 are broken, detail views to illustrate the mounting of the sections. Fig. 3 is a side view showing an alining-strip of a side-section mounted upon a supporting-strip of the middle section. Fig. 4 is a plan view of the parts shown in Fig. 3. Fig. 5 is a view, on an enlarged scale, of an intermediate strip of a section, and a shifting-bar connected therewith, the tooth-bearing rollers being in section. Fig. 6 is a view to clearly show one of the links and its flexible connection with the axle and side-sections.

Referring now to the drawing for a more particular description, the harrow consists, in part, of a middle section 1 and a pair of side-sections 2, all of the sections being connected with the axle 3 upon which the wheels 4 are revolubly mounted, means being provided, when the harrow moves forwardly, for maintaining the sections, while disposed side by side, in alinement, substantially at right angles to the line of draft.

Numerals 5 and 6 respectively indicate the front and rear supporting-strips of the middle section. Strip 5 is connected, midway between its ends, with the axle 3 by means of link 7, said link having one of its ends mounted rigid with bracket 8 upon strip 5, its opposite end being pivotally mounted upon bracket 9 which is secured to the axle.

The rear supporting-strip 6 is provided with a caster wheel 10, the arms *a* of which are mounted upon the collar *b* which circumscribes the upright standard 11 upon which the apertured block 12 may have slidable movements longitudinally thereof.

At 13 are indicated a pair of brackets by means of which the block 12 is secured upon and midway between the ends of said strip 6. The caster wheel therefore may have swinging movements upon standard 11, the projection *c*, near the lower end of the standard, preventing the collar *b* from moving longitudinally of said standard.

Disposed transversely of and connected with strips 5 and 6, near the ends thereof, are parallel bearing-strips 14, this connection preferably being by means of the loops *d*. They are maintained parallel, preferably, by means of cross-braces 15. At 16 is indicated an intermediate strip disposed midway between and parallel with strips 14.

At 17 are indicated a plurality of bars or tooth-bearing rollers. They are disposed, preferably, parallel, and they traverse apertures *e* formed in strips 14 and 16. In order that bars 17 may have, simultaneously, a limited rotatable movement to change the inclination of the teeth, a shifting-bar 18 is provided. It is disposed parallel with strip 16 and is pivotally mounted at *f* upon each outwardly projecting finger 19 of a bar 17.

In order that the shifting bar may be moved longitudinally to cause a rotatable movement of bars 17, a spool 20 is provided, and is mounted upon strip 16. A strand 21 is connected with one of fingers 19, and after engaging spool 20 it engages spool 24 which is mounted on bracket 25, said bracket being mounted on the tongue 26, and after engaging said spool 24 this strand is wound upon the drum 23, said drum having a shaft *t* mounted in arms *x x* which project rearwardly from the axle.

It will thus be seen that a driver who may ride upon the seat 27 may, by manual use of sprocket chain 28, cause a rotation of wheel 29, with the result that the inclination of the harrow teeth may be changed, and this operation is often desirable, depending upon the kind of ground to be harrowed, and the depth to which it is required that the teeth shall penetrate. Numeral 52 indicates a foot-rest mounted upon the arms 27′.

Each of sections 2 consists of the front and rear alining-strips respectively indicated at 30 and 31, these strips being flexibly connected near their ends with the bearing-strips 14′, said bearing-strips being maintained parallel by means of braces 15′. These side sections are substantially the same in construction and operation as the middle section. They are each provided with an intermediate strip 16′; and strips 14′ and 16′ are traversed by bars 17′ upon which are mounted the harrow teeth. By means of the pair of strands or cables 21′, each of which is connected with one of fingers 19′, said bars 17′ may have a limited rotatable movement to change the inclination of the harrow teeth carried thereby, said fingers 19′ being mounted upon members 17′ and being pivotally mounted on the shifting-bars 18′. Said strands or cables 21′ engage spools 20′ and are mounted upon drum 23, after engagement with said spool 24; and a rotatable movement of the sprocket wheel 29, therefore, will simultaneously change the inclination of the teeth of all of the sections.

The front alining strip 30 of each section 2 is connected flexibly with the axle by means of a link 32.

Mounted upon the ends of supporting-strips 5 and 6 are socket-members or brackets 33, substantially of U-shape in cross-section. They are adapted to engage with the alining-strips of sections 2 for a support thereof, this engagement being between the ends of said alining strips. The inner ends of strips 30 and 31 are mounted upon clevis-members 34, with which strips 5 and 6 are provided, the pins or lugs *h* of the alining-strips engaging in the slots *k* of said clevis-members. Slots *k* are of angular form, as clearly shown in Fig. 3, each of the inner ends of said slots having a recess 35 opening thereon. When it is desired to drive through a gateway, sections 2 may be manually swung over and may be supported by the middle section, strips 30 and 31 moving outwardly of brackets 33; and during the swinging movements of sections 2, the pins *h* will leave recesses 35, and will move upwardly in slots *k*. In order that the sections may be folded, one upon another, the arms 27′ which support the seat, and which are mounted at *r* upon the arms *x x*, may be swung upwardly or forwardly.

When sections 2 are swung downwardly, strips 30 and 31 will engage in the U-shaped brackets, and pins *h* will engage within recesses 35. On account of the construction as described, the mounting of strips 30 and 31 will tend to maintain sections 2 in alinement with the middle section, horizontally considered, but vertically considered, they may have swinging movements with reference to said middle section.

When moving over obstructions, or when "turning about" at the end of a field, all of the sections may be elevated, the caster wheel and wheels 4 sustaining the weight of the sections. The upper end of standard 11 is provided with a spool 36, and block 12 is provided with a spool 37.

At 38 is indicated a spool which is mounted midway between the ends of strip 6 of the middle section, and by means of strand 39 which is connected with the block 12 and engages spools 36, 37 and 38, and which is wound upon the drum 40, after engaging spools 22, 22′ and 24, the sections may be elevated, spool 22′ being suitably mounted on arms *x x*.

At 41 is indicated a sprocket wheel, its shaft *m* having bearings in arms *x x*. It is provided with an endless chain 42 which may be moved manually for winding the strand or cable 39 upon the drum 40, and a driver while riding upon the seat 27 may conveniently elevate all of the sections when passing over obstructions, and by means of the pawl 43 the sections may be maintained in an elevated position, this being convenient when driving upon a highway, or from one field to another.

At 44 is indicated a brace-bar connected near its inner end by a pair of springs 48 with strip 6. This brace-bar is hingably mounted at its outer end upon bracket 45, said bracket being mounted upon the standard, near the upper end thereof, and its lower end is provided with a pin 46 adapted to work in slot 47 formed longitudinally in the intermediate strip 16 of the middle section. During the operation of elevating the sections, the pin will slide forwardly in the slot, subject to the resistance of springs 48, and said brace tends to support the standard 11 in an upright position while the sections are being elevated. At 49 are indicated a pair of brackets mounted upon strip 6. They are provided with sleeves 50 which are mounted upon one of rollers 17 of said middle section.

It will be noted that when the harrow is moving forwardly with the teeth engaging the ground the strands or cables 21 and 21′ will be subjected to a considerable degree of tension, for the reason that rollers 17 and 17′ are mounted revolubly, pawl *s* in engagement with the ratchet wheel *s*′ preventing the drum 23 from being unwound. Adjustable means are provided for mounting bracket 25 at selected distances forwardly or rearwardly upon the tongue 26, to prevent the front end of the tongue from being disposed too high or too low. Bracket 25 is provided with a keeper or set-screw 51, and if the parts are so adjusted that this bracket is disposed too far forwardly, the tongue, normally, will swing downwardly; and there will be a tendency for the tongue to swing upwardly if the bracket is mounted too near to the axle.

In operation, by means of keeper 51 the bracket may be so adjusted that the weight of the driver upon seat 27 will balance the weight of the tongue, or substantially so. It is understood, of course, that when the teeth engage the ground at a considerable depth, comparatively, the tension of the cables or strands will be greater, but the longitudinal adjustment described may be depended upon for providing substantially a practical balance between the weight of the tongue and weight of the driver.

Having fully described the several parts and their uses, a further explanation relating to operation, is not necessary. While I have shown a foldable frame consisting of sections which are provided with harrow teeth, and prefer this construction, I do not wish to be understood as limiting myself in this respect, and I may use a single frame, and may employ other means than those described for elevating the frame. Also other details of construction may be changed, it being understood that these changes are to be within the scope of the claims.

What I claim and desire to secure by Letters Patent is,—

1. A harrow comprising a vehicle, a caster wheel, a frame provided with harrow teeth disposed between the vehicle and caster wheel, and devices on the frame connected with the vehicle and caster wheel for elevating said frame.

2. A harrow comprising a vehicle, a caster wheel, a frame interposed between the vehicle and caster wheel and provided with tooth-bearing bars, devices on the frame connected with the vehicle for causing a rotatable movement of the tooth-bearing bars, and devices on the caster wheel connected with the frame and vehicle for elevating said frame.

3. In devices for the purpose described, a vehicle, a caster wheel, a primary frame provided with tooth-bearing rollers and interposed between the vehicle and caster wheel, a pair of secondary frames disposed at the sides of the primary frame each being provided with tooth-bearing rollers and adapted to be swung to positions above the primary frame, devices upon the primary and secondary frames connected with the vehicle for elevating said frames, devices upon the vehicle connected with the primary frame and caster wheel for elevating said primary frame, and devices upon said tooth bearing rollers connected with the vehicle for revolubly moving said rollers.

In testimony whereof, I have affixed my signature in presence of two witnesses.

CALVIN N. CAMPBELL.

Witnesses:
 HIRAM A. STURGES,
 PEARL M. EDWARDS.

---

Copies of this patent may be obtained for five cents each, by addressing the "Commissioner of Patents, Washington, D. C."